US011753811B2

(12) United States Patent
Park

(10) Patent No.: US 11,753,811 B2
(45) Date of Patent: Sep. 12, 2023

(54) APPARATUS FOR PREVENTING OFFENSIVE ODORS FOR DRAIN PORT

(71) Applicant: Yung Suk Park, Samcheok-si (KR)

(72) Inventor: Yung Suk Park, Samcheok-si (KR)

(*) Notice: Subject to any disclaimer, the term of this patent is extended or adjusted under 35 U.S.C. 154(b) by 168 days.

(21) Appl. No.: 17/406,481

(22) Filed: Aug. 19, 2021

(65) Prior Publication Data

US 2022/0074188 A1 Mar. 10, 2022

(30) Foreign Application Priority Data

Sep. 9, 2020 (KR) .................. 10-2020-0115343

(51) Int. Cl.
*E03F 5/04* (2006.01)
*C02F 1/00* (2023.01)
*B01D 35/02* (2006.01)
*C02F 103/00* (2006.01)

(52) U.S. Cl.
CPC .............. *E03F 5/041* (2013.01); *B01D 35/02* (2013.01); *C02F 1/001* (2013.01); *E03F 5/0404* (2013.01); *E03F 5/0405* (2013.01); *C02F 2103/001* (2013.01); *C02F 2303/02* (2013.01); *C02F 2307/08* (2013.01); *E03F 2005/0417* (2013.01)

(58) Field of Classification Search
CPC .... E03F 5/041; C02F 1/001; C02F 2103/001; C02F 2303/02; C02F 2307/08
See application file for complete search history.

(56) References Cited

U.S. PATENT DOCUMENTS 3,332,557 A * 7/1967 Pall .................. B01D 29/23
210/497.3
4,935,132 A * 6/1990 Schaier ............. B01D 17/0202
210/485

FOREIGN PATENT DOCUMENTS

| KR | 20-1995-0003894 U | | 2/1995 |
| KR | 19990035237 U | * | 9/1999 |
| KR | 20-0317103 Y1 | | 6/2003 |
| KR | 10-0454999 B1 | | 11/2004 |
| KR | 10-0807073 B1 | | 2/2008 |
| KR | 10-0835751 B1 | | 6/2008 |
| KR | 20-1999-0035237 U | | 9/2009 |
| KR | 10-2190972 B1 | | 12/2010 |
| KR | 10-2011-0037807 A | | 4/2011 |
| KR | 20-0461576 Y1 | | 7/2012 |

* cited by examiner

*Primary Examiner* — Liam Royce
(74) *Attorney, Agent, or Firm* — KORUS Patent, LLC; Seong Il Jeong

(57) ABSTRACT

The present disclosure provides an apparatus for preventing offensive odors for a drain port, the apparatus including: a plate that is formed in a plate shape so that it can be stably attached to the upper part of a drain manhole, and has a through hole formed in the center; a drain pipe that is connected to the through hole in the lower direction of the plate, is bent laterally from the lower direction, and has a shape in which an end is cut diagonally; and a shielding film that is connected by a hinge to the end of the drain pipe, is opened by rainwater or sewage discharged from the drain pipe, or is closed by a load. With such a configuration, a drain pipe is formed to guide rainwater, and a shielding film that is opened by rainwater or closed by a load is provided at the end part of the drain pipe, thereby preventing offensive odors generated from the drain port and also preventing insects from flowing into the drain port.

2 Claims, 5 Drawing Sheets

APPARATUS FOR PREVENTING OFFENSIVE ODORS FOR DRAIN PORT

TECHNICAL FIELD

The present disclosure provides an apparatus for preventing offensive odors for a drain port, and more specifically, an apparatus for preventing offensive odors for a drain port which is used for preventing offensive odors generated from the drain port or insects flowing into the drain port.

BACKGROUND ART

In general, a drain port or a manhole is one of the drainage facilities installed at the edge of the road, and is for draining rainwater flowing from the road surface through the drain pipe.

The drain port or manhole is usually open, and so if various foreign substances are put and accumulated when it does not rain, the drain port and drain pipe are blocked by foreign substances accumulated in the drain port when it actually rains. Thus, there was problems that not only the drain port and drain pipe are blocked by foreign substances accumulated in the drain port, making it impossible to drain rainwater or sewage normally, but also sewage from the water pipe flows backward. In addition, offensive odors are generated from sewage stagnant in drain ports or drain pipes, and environmental problems such as air pollution are serious.

As a conventional technique for solving these problems, Korean Registered Utility Model Publication No. 20-0461576 discloses a rain gutter for preventing the inflow of foreign substances and the generation of offensive odors which includes: a main body having first and second passages that introduce and drain a sewage; a first door that opens the first passage when the sewage is drained in the forward direction to the first passage, and closes the first passage when the sewage flows backward from the first passage; a second door that opens the second passage when the sewage is drained in the forward direction into the second passage and closes the second passage when the sewage flows backward from the second passage; an elastic pressing means that elastically presses the first door toward a closed position so that the first passage can be opened only when the flow pressure of the sewage introduced into the first passage is equal to or greater than the set pressure; and a collection net installed on the second passage so as to collect foreign substances in the sewage passing through the second passage.

This allows foreign substances contained in sewage to collect with a collection net, but when a predetermined amount of foreign substances was caught in the collection net, there were problems that the sewage could not be easily discharged and could flow back, and additionally, there was a cumbersome problem of having to clean the collection net separately.

PRIOR ART LITERATURE

Patent Literature (Patent Literature 1) Korean Registration No. 20-0461576
(Patent Literature 2) Korean Unexamined Publication No. 20-1995-0003894
(Patent Literature 3) Korean Registration No. 20-0317103
(Patent Literature 3) Korean Registration No. 10-0807073

DETAILED DESCRIPTION OF THE INVENTION

Technical Problem

The present disclosure has been designed to solve the above-mentioned problems, and an object of the present disclosure is not only to prevent offensive odors generated from the drain port, but also to prevent insects flowing in through the drain port.

Technical Solution

In order to achieve the above object, a preferred embodiment of the present disclosure provides an apparatus for preventing offensive odors for a drain port comprising: a plate that is formed in a plate shape so that it can be stably attached to the upper part of a drain manhole, and has a through hole formed in the center; a drain pipe that is connected to the through hole in the lower direction of the plate, is bent laterally from the lower direction, and has a shape in which an end is cut diagonally; and a shielding film that is connected by a hinge to the end of the drain pipe, is opened by rainwater or sewage discharged from the drain pipe, or is closed by a load.

Further, the drain pipe includes an upper pipe that is connected so as to be perpendicular to the plate, and a lower pipe that is connected to the lower end of the upper pipe in a direction of 75 to 85 degrees.

Further, the end part of the lower pipe is connected to the shielding film to be unfolded between the lower pipe and the shielding film at the time of opening the shielding film, and is provided with a filtering net for filtering foreign substances.

Further, the inner upper part of the lower pipe is provided with an elastic body connected to the filtering net, and the elastic body is expanded at the time of opening the shielding film and contracted at the time of closing the shielding film.

The filtering net is provided with a first reinforcing body connected along the central perimeter, and the elastic body is integrally connected to the center of the second reinforcing body and the first reinforcing body adjacent to the second reinforcing body.

Advantageous Effects

According to the apparatus for preventing offensive odors for a drain port of the present disclosure, a drain pipe is formed to guide rainwater, and a shielding film that is opened by rainwater or closed by a load is provided at the end part of the drain pipe, thereby preventing offensive odors generated from the drain port and also preventing insects from flowing into the drain port.

DETAILED DESCRIPTION OF THE EMBODIMENTS

Figure 1:
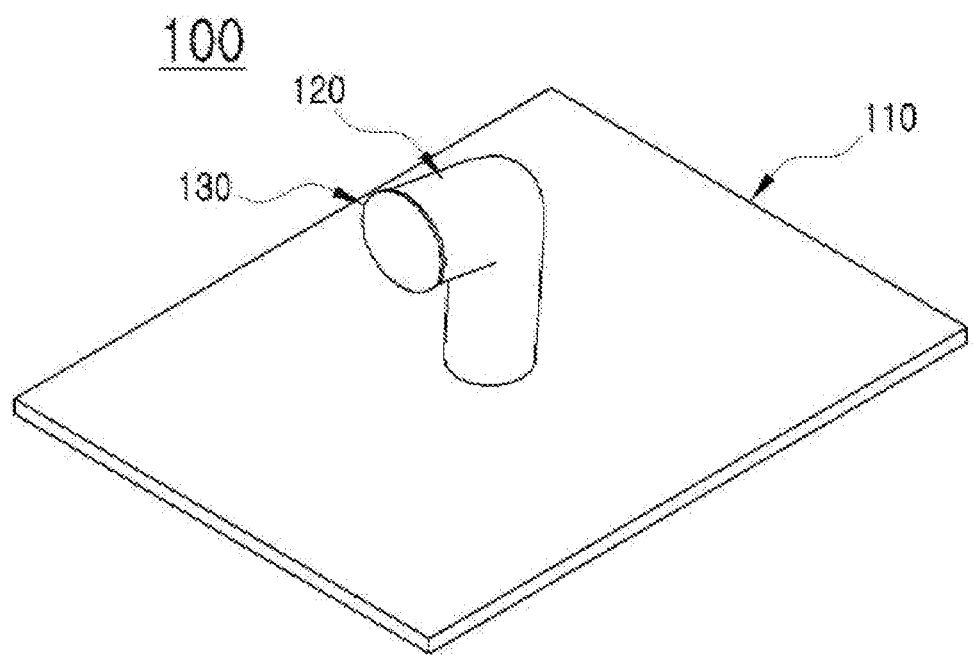
FIG. 1 is a bottom perspective view of the apparatus for preventing offensive odors for a drain port according to the first embodiment of the present disclosure.

Advantages and features of the present disclosure and a method of achieving the same should become clear with embodiments described in detail below with reference to the accompanying drawings.

However, the present disclosure is not limited to the embodiments disclosed below and may be realized in various other forms. The embodiments make the disclosure of the invention complete and are provided to completely inform those of ordinary skill in the art of the scope of the disclosure. The present disclosure is defined only by the scope of the claims. Like reference numerals refer to like elements throughout.

Hereinafter, the present disclosure will be described with reference to the drawings for explaining the apparatus for preventing offensive odors for a drain port according to embodiments of the present disclosure.

Figure 2:
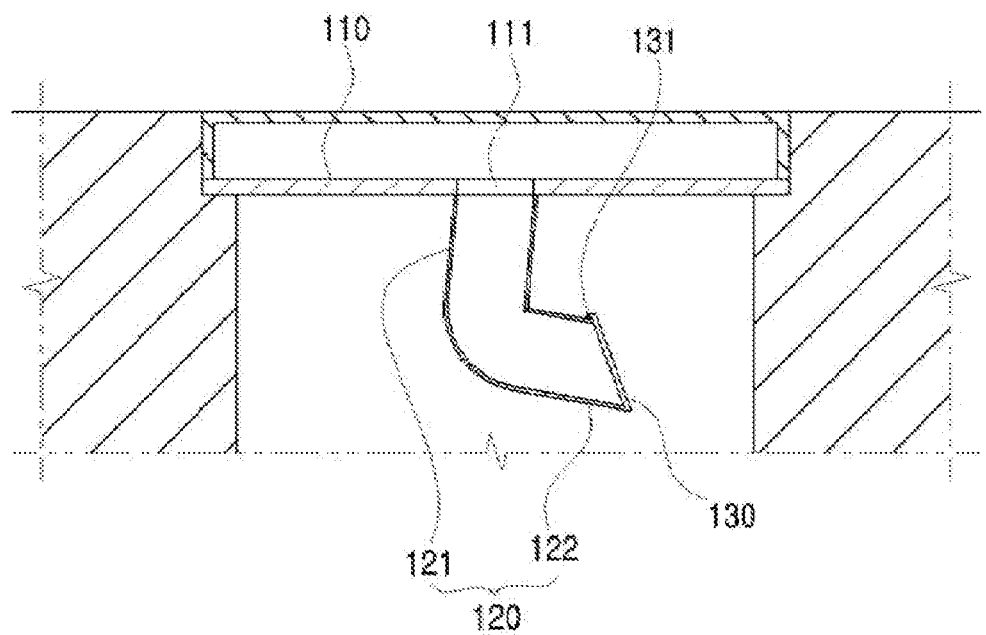
FIG. 2 is a side cross-sectional view of the apparatus for preventing offensive odors for a drain port according to a first embodiment of the present disclosure.
Figure 3:
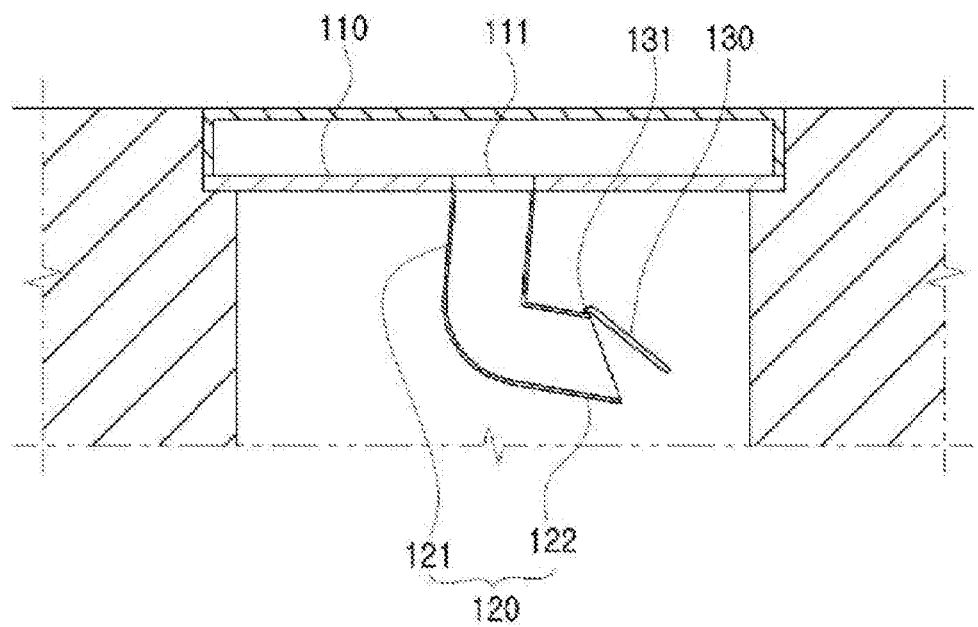
FIG. 3 is an operation diagram of FIG. 2 according to the first embodiment of the present disclosure.

FIG. 1 is a bottom perspective view of the apparatus for preventing offensive odors for a drain port according to the first embodiment of the present disclosure. FIG. 2 is a side cross-sectional view of the apparatus for preventing offensive odors for a drain port according to a first embodiment of the present disclosure. FIG. 3 is an operation diagram of FIG. 2 according to the first embodiment of the present disclosure.

Referring to these Figures, the apparatus for preventing offensive odors for a drain port according to this embodiment has a feature that it is possible to prevent offensive odors as well as insects flowing in from the drain port.

The apparatus 100 for preventing offensive odors for a drain port according to this embodiment that can provide the above effect includes a plate 110, a drain pipe 120, and a shielding film 130.

The plate 110 is stably attached to the upper end of the drain manhole to which the steel grating is stably attached, has a plate shape, and has a through hole 111 formed vertically in the center.

Here, the plate 110 is stably attached to a locking projection formed along the perimeter of the upper end so that the steel grating can be stably attached to the upper end of the drain manhole.

The drain pipe 120 is connected to a through hole 111 in the lower direction of the plate 110, and includes an upper pipe 121 and a lower pipe 122.

Specifically, the upper pipe 121 is connected so as to be perpendicular to the plate 110.

Here, the upper pipe 121 has an inclination of approximately 5 to 10 degrees.

The lower pipe 122 is connected to the lower end of the upper pipe 121 at an angle of approximately 75 to 85 degrees.

At this time, the drain pipe 120 has an approximately "L" shape.

And, the lower pipe 122 has a shape in which the end part is cut diagonally.

At this time, the diagonal direction is formed from the upper rear to the lower front.

The shielding film 130 is connected by a hinge 131 to the end part of the drain pipe 120, and is pushed and opened by rainwater or sewage discharged from the drainage pipe 120, or closed by a load.

Through such a configuration, the drain pipe 120 can prevent offensive odors or insects by opening or closing the shielding film 130 by rainwater or sewage discharged to the drain port.

Figure 4:
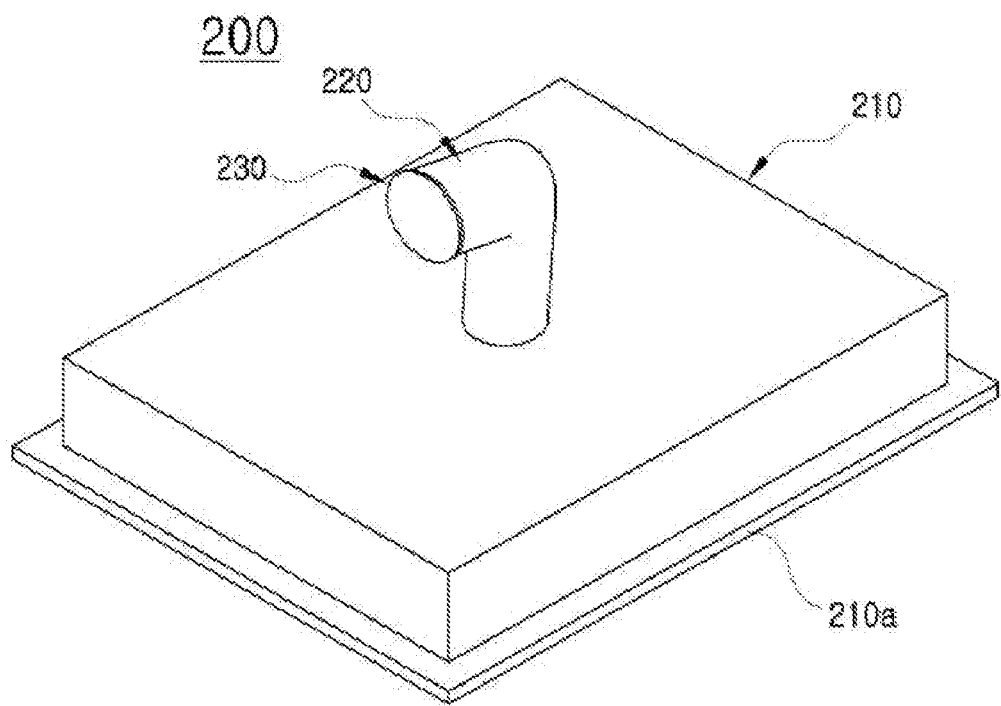
FIG. 4 is a bottom perspective view of the apparatus for preventing offensive odors for a drain port according to a second embodiment of the present disclosure.
Figure 5:
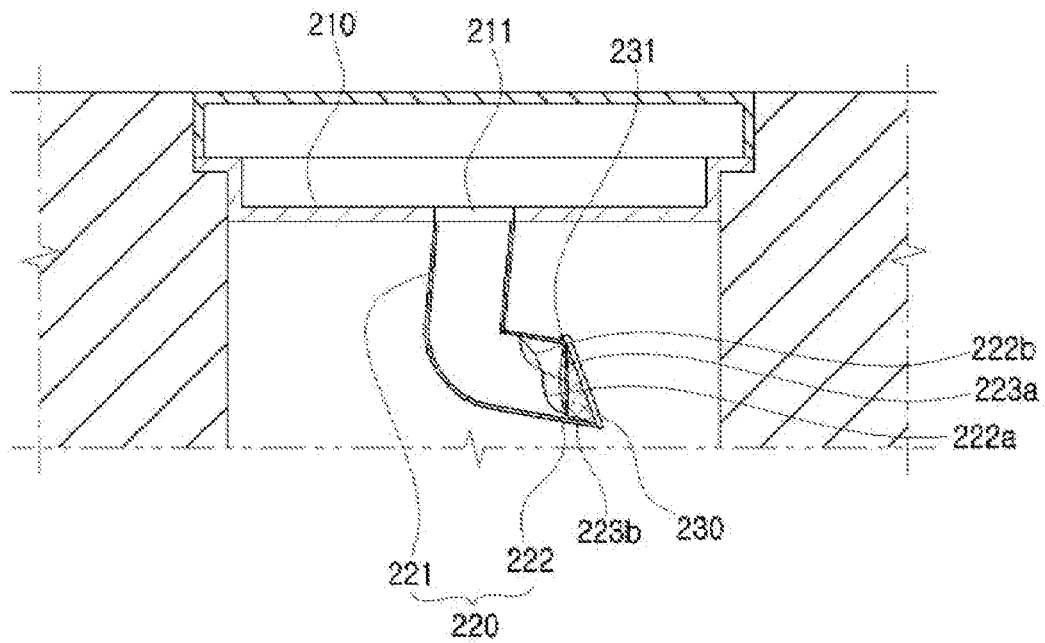
FIG. 5 is a side cross-sectional view of the apparatus for preventing offensive odors for a drain port according to a second embodiment of the present disclosure.
Figure 6:
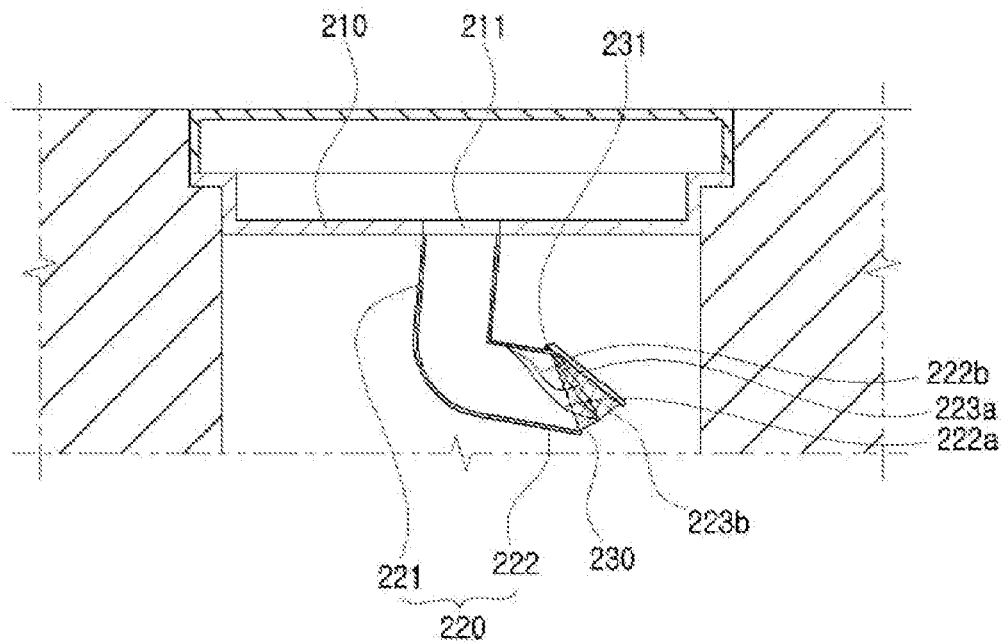
FIG. 6 is an operation diagram of FIG. 2 according to a second embodiment of the present disclosure.
Figure 7:
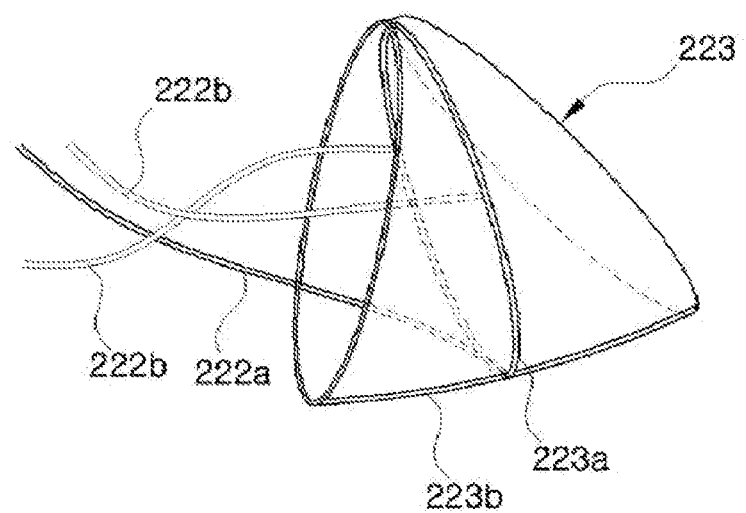
FIG. 7 is a perspective view of a filtering net according to a second embodiment of the present disclosure.
Figure 8:
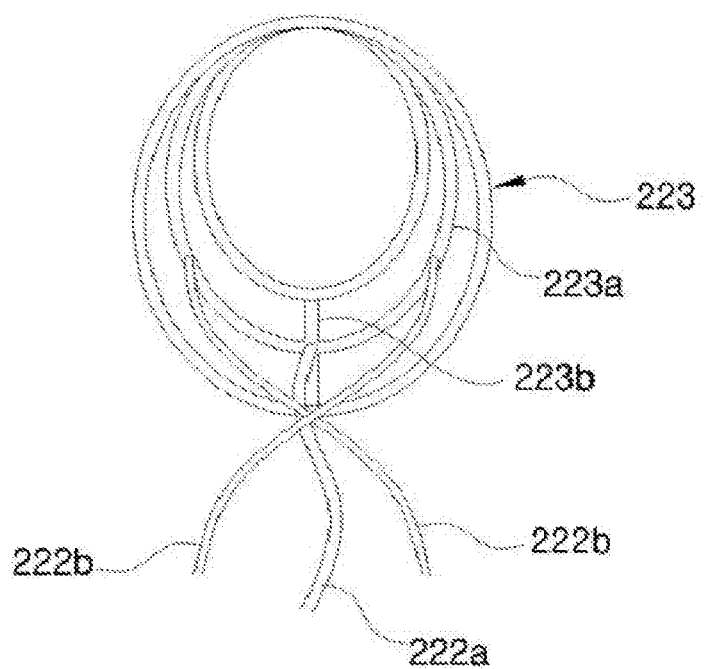
FIG. 8 is a front view of a filtering net according to a second embodiment of the present disclosure.

FIG. 4 is a bottom perspective view of the apparatus for preventing offensive odors for a drain port according to a second embodiment of the present disclosure. FIG. 5 is a side cross-sectional view of the apparatus for preventing offensive odors for a drain port according to a second embodiment of the present disclosure. FIG. 6 is an operation diagram of FIG. 2 according to a second embodiment of the present disclosure. FIG. 7 is a perspective view of a filtering net according to a second embodiment of the present disclosure. FIG. 8 is a front view of a filtering net according to a second embodiment of the present disclosure.

The apparatus 200 for preventing offensive odors for a drain port according to this embodiment includes a plate 210, a drain pipe 220, and a shielding film 230.

The plate 210 is stably attached to the upper end of the drain manhole to which a steel grating is stably attached, has a plate shape, and has a through hole 211 formed vertically in the center. Here, the plate 210 is stably attached to a locking projection formed along the perimeter of the upper end so that the steel grating can be stably attached to the upper end of the drain manhole.

Moreover, the plate 210 is bent upward so that the rim can be caught to the locking projection and fixed, and a fixing projection 210a may be formed so that the end thereof is bent to the locking projection.

Although not shown, it is preferable that a rubber packing (not shown) is coupled to the shortest end part of the fixing projection 210a along the perimeter.

The drain pipe 220 is connected to a through hole 211 in the lower direction of the plate 210, and includes an upper pipe 221 and a lower pipe 222.

Specifically, the upper pipe 221 is connected so as to be perpendicular to the plate 210.

The lower pipe 222 is connected to the lower end of the upper pipe 221 at an angle of approximately 75 degrees to 85 degrees.

At this time, the drain pipe 220 has an approximately "L" shape.

Further, the lower pipe 222 has a shape in which the end part is cut diagonally.

At this time, the diagonal direction is formed from the upper rear to the lower front.

The shielding film 230 is connected by a hinge 231 to the end part of the drain pipe 220, and is pushed and opened by rainwater or sewage discharged from the drain pipe 220, or is closed by a load.

Moreover, the end part of the lower pipe 222 is connected to the shielding film 230 so as to be unfolded between the lower pipe 222 and the shielding film 230 at the time of opening the shielding film 230, and is provided with a filtering net 223 for filtering foreign substances.

The filtering net 223 is preferably formed so that rainwater and sewage can permeate.

In addition, an elastic body 222a connected to the filtering net 223 is provided at an inner upper end of the lower pipe 222.

At this time, the elastic body 222a is expanded while the filtering net 223 is unfolded at the time of opening the shielding film 230.

And, when the shielding film 230 is closed, it is contracted and the filtering net 223 is pulled so as to be introduced into the lower pipe 222.

In this case, the elastic body 222a is weaker than the load of the shielding film 230, and preferably has an elastic force greater than the load of the filtering net 223.

In addition, the first reinforcing body 223a is connected to the filtering net 223 along the central perimeter, and a second reinforcing body 223b is connected between the lower pipe 222 and the shortest end part of the shielding film 230.

Here, the elastic body 222a is connected to a position where the first reinforcing body 223a and the second reinforcing body 223b are adjacent to each other and replaced.

Accordingly, as the elastic body 222a is contracted, the filtering net 223 is pulled as a whole and the whole of the filtering net 223 is drawn into the lower pipe 222, so that the shielding film 230 is closely adhered to the end part of the lower pipe 222.

Further, rubber bands 222b are provided on both sides of the elastic body 222a on the inner side of the lower pipe 222, respectively.

Each of the rubber bands 222b crosses each other to be approximately an "X" shape, so that each end part is connected to both sides of the filtering net 223.

At this time, the rubber band 222b has the same elastic force as the elastic body 222a, and when the filtering net 223 is drawn into the interior of the lower pipe 222, the volume is reduced by pulling in opposite directions on both sides.

According to the apparatus for preventing offensive odors for a drain port of the present disclosure, a drain pipe is formed to guide rainwater, and a shielding film that is opened by rainwater or closed by a load is provided at the end part of the drain pipe, thereby preventing offensive odors generated from the drain port and also preventing insects from flowing into the drain port.

Those of ordinary skill in the art will understand that the invention may be embodied in other specific forms without changing the technical spirit or essential features thereof. Therefore, it should be understood that the embodiments described above are illustrative in all respects and are not restrictive. The scope of the present disclosure is presented by the appended claims rather than the above detailed description, and all changes or modifications derived from the meaning and scope of the claims and their equivalents should be construed as being included in the scope of the present disclosure.

DESCRIPTION OF REFERENCE NUMERALS

100: order preventing apparatus
110: plate
111: through hole
120: drain pipe
121: upper pipe
122: lower pipe
130: shielding film
131: hinge

What is claimed is:

1. An apparatus for preventing offensive odors for a drain port comprising:
   a plate that is formed in a plate shape and configured to be stably attached to an upper part of a drain manhole, and has a through hole formed in a center;
   a drain pipe that is connected to the through hole in a lower direction of the plate, is bent laterally from the lower direction, and has a shape in which an end is cut diagonally; and
   a shielding film that is connected by a hinge to the end of the drain pipe, is opened by rainwater or sewage discharged from the drain pipe, or is closed by a load,
   wherein:
   the drain pipe comprises,
   an upper pipe that is connected so as to be perpendicular to the plate, and
   a lower pipe that is connected to a lower end of the upper pipe in a direction of 75 to 85 degrees with respect to a longitudinal axis of the upper pipe,
   wherein:
   an end part of the lower pipe is connected to the shielding film to be unfolded between the lower pipe and the shielding film at a time of opening the shielding film, and is provided with a filtering net for filtering foreign substances,
   wherein:
   an inner upper part of the lower pipe is provided with an elastic body connected to the filtering net, and
   the elastic body is expanded at the time of opening the shielding film and contracted at a time of closing the shielding film.

2. The apparatus of claim 1, wherein:
   the filtering net is provided with a first reinforcing body connected along a central perimeter, and
   the elastic body is integrally connected to a center of a second reinforcing body and the first reinforcing body adjacent to the second reinforcing body.

* * * * *